United States Patent [19]
Sato

[11] Patent Number: 5,905,526
[45] Date of Patent: *May 18, 1999

[54] APPARATUS FOR GENERATING IMAGE SIGNAL

[75] Inventor: Koichi Sato, Itabashi-ku, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/561,435

[22] Filed: Nov. 21, 1995

[30] Foreign Application Priority Data

Dec. 1, 1994 [JP] Japan .................................. 6-323491

[51] Int. Cl.[6] .................................................. H04N 1/203
[52] U.S. Cl. ............................. 348/96; 348/110; 396/429
[58] Field of Search ....................... 348/96–111; 396/429; H04N 1/04, 1/203

[56] References Cited

U.S. PATENT DOCUMENTS

| 4,689,691 | 8/1987 | Isogai et al. | 348/96 |
| 4,903,131 | 2/1990 | Lingemann et al. | 348/96 |
| 4,974,068 | 11/1990 | Hiramatsu et al. | 348/96 |
| 5,146,321 | 9/1992 | Lees et al. | 348/96 |
| 5,401,620 | 3/1995 | Sasai et al. | 430/363 |
| 5,424,156 | 6/1995 | Aoki et al. | |
| 5,541,644 | 7/1996 | Nanba | 348/96 |
| 5,693,421 | 12/1997 | Kamiyama et al. | 428/411.1 |

FOREIGN PATENT DOCUMENTS

| 0327236 | 8/1989 | European Pat. Off. | H04N 5/74 |
| 5-2280 | 1/1993 | Japan | G03G 5/14 |
| 5-24706 | 4/1993 | Japan | H04N 5/222 |
| 5150251 | 6/1993 | Japan | G02F 1/1343 |
| 6313894 | 11/1994 | Japan | G02F 1/135 |

OTHER PUBLICATIONS

English Language Abstract of JP No. 5–150251.

*Primary Examiner*—Bryan Tung
*Assistant Examiner*—Vu Le
*Attorney, Agent, or Firm*—Greenblum & Bernstein, P.L.C.

[57] ABSTRACT

An image signal sensing device electronically develops an image formed thereon. A light source illuminates an electro-developing recording medium. A line sensor associated with a scanner optical system is disposed on an imaging plane on which an image is formed. The electro-developing recording medium is supported by a recording medium holder that is movably connected to a feeding mechanism. The electro-developing recording medium is positioned between the light source and the scanner optical system. The electro-developing recording medium is moved by the feeding mechanism so that the image formed on the electro-developing recording medium is read by the line sensor.

9 Claims, 5 Drawing Sheets

APPARATUS FOR GENERATING IMAGE SIGNAL

BACKGROUND OF THE INVENTION

1. Field of the Invention

The present invention relates to a device which is provided in an electronic still video camera, for example, and which keeps a visible image corresponding to an optical image obtained through a photographing lens, and which generates an image signal in accordance with the visible image.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazo type photographic materials, free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed in which a recording medium made of the photographic material is electronically and directly developed similarly to a silver halide photographic material, so that the developed visible image can be immediately seen or recorded. Such a recording medium, in which a visible image is electronically developed, is referred to as an electro-developing recording medium in this specification.

Japanese Unexamined Patent Publication No. 5-2280, for example, discloses a recording medium which is a combination of an electrostatic information recording medium and an electric charge keeping medium, the electrostatic information recording medium having a photoconducting layer and an inorganic oxide material layer, and the electric charge keeping medium having a liquid crystal display. In this structure, when the electrostatic information recording medium is exposed while an electric voltage is applied to the electrostatic information recording medium and the electric charge keeping medium, an electric charge in accordance with the amount of incident light is generated in the electrostatic information recording medium. Since the intensity of an electric field applied to the liquid crystal display facing the electrostatic information recording medium varys in accordance with the generated electric charge, an image corresponding to the amount of light distribution is indicated or developed on the liquid crystal display.

Japanese Unexamined Patent Publication No. 5-150251 discloses a dispersion type liquid crystal display in which an image indicated on the liquid crystal display is kept, even if the electric field applied to the liquid crystal display is removed.

Conventionally, however, there is no optical mechanism such as a camera in which an electrophotographic material, by which simultaneous development can be performed, is used. Therefore, it has been desired to develop a device by which an image obtained by the electrophotographic material is converted into an electric signal, for example, and is outputted from the device.

SUMMARY OF THE INVENTION

Therefore, an object of the present invention is to provide an image signal input device by which a still image signal is generated and a plurality of photography operations can be performed in a short time.

According to the present invention, there is provided an image signal sensing device comprising, an electro-developing recording medium electronically developing an image formed thereon, forming means for forming the image, which is formed on the electro-developing recording medium, on an imaging plane, a line sensor provided on the imaging plane, and a feeding mechanism moving at least one of the electro-developing recording medium and the line sensor in such a manner that the line sensor reads the image formed on the imaging plane.

Further, according to the present invention, there is provided an image signal sensing device comprising a first optical system, an electro-developing recording medium, a light source, a second optical system, a line sensor, and a feeding mechanism. The electro-developing recording medium electronically develops an image formed by the first optical system. The light source illuminates the electro-developing recording medium. The second optical system is disposed on an optical path of a light beam which is generated by illuminating the electro-developing recording medium. The line sensor is disposed on an imaging plane on which an image is formed by the second optical system. The feeding mechanism moves at least one of the electro-developing recording medium and the line sensor in a direction different from the longitudinal direction of the line sensor.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
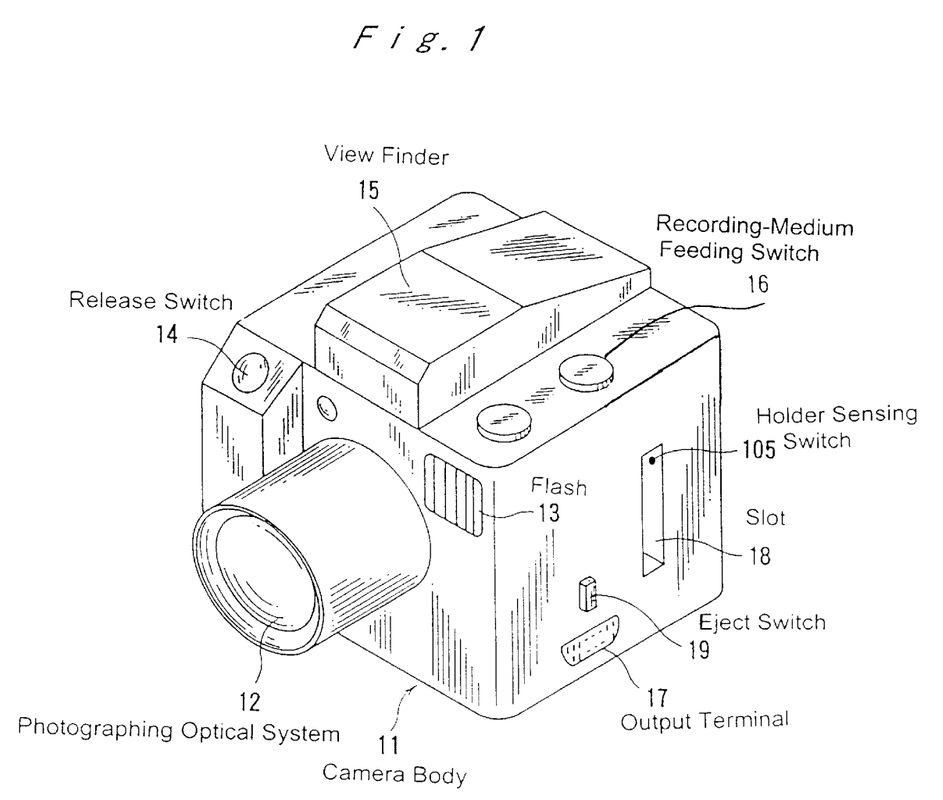
FIG. 1 is an external view showing a still video camera to which an embodiment according to the present invention is applied.

FIG. 1 is an external view of a still video camera to which an embodiment of the present invention is applied.

When viewing a camera body 11 from a front side, on the front surface of the camera body 11, a photographing optical system 12 including a photographing lens and so on is provided on approximately the central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and an operation switch such as a recording medium feeding switch 16 is provided close to the view finder 15.

On a side surface of the camera body 11, an output terminal 17 is formed on a lower portion thereof so that an image signal obtained by this camera can be outputted to an external recording device. Further, on the side surface of the camera body 11, a slot 18 into which a recording medium holder 100 (see FIGS. 2 and 3) is inserted is formed. A holder sensing switch 105 is provided at an entrance portion of the slot 18, and is turned on by being engaged with the recording medium holder 100. An eject switch 19, which is pressed when removing the recording medium holder 100 from the slot 18, is provided close to the slot 18.

Figure 2:
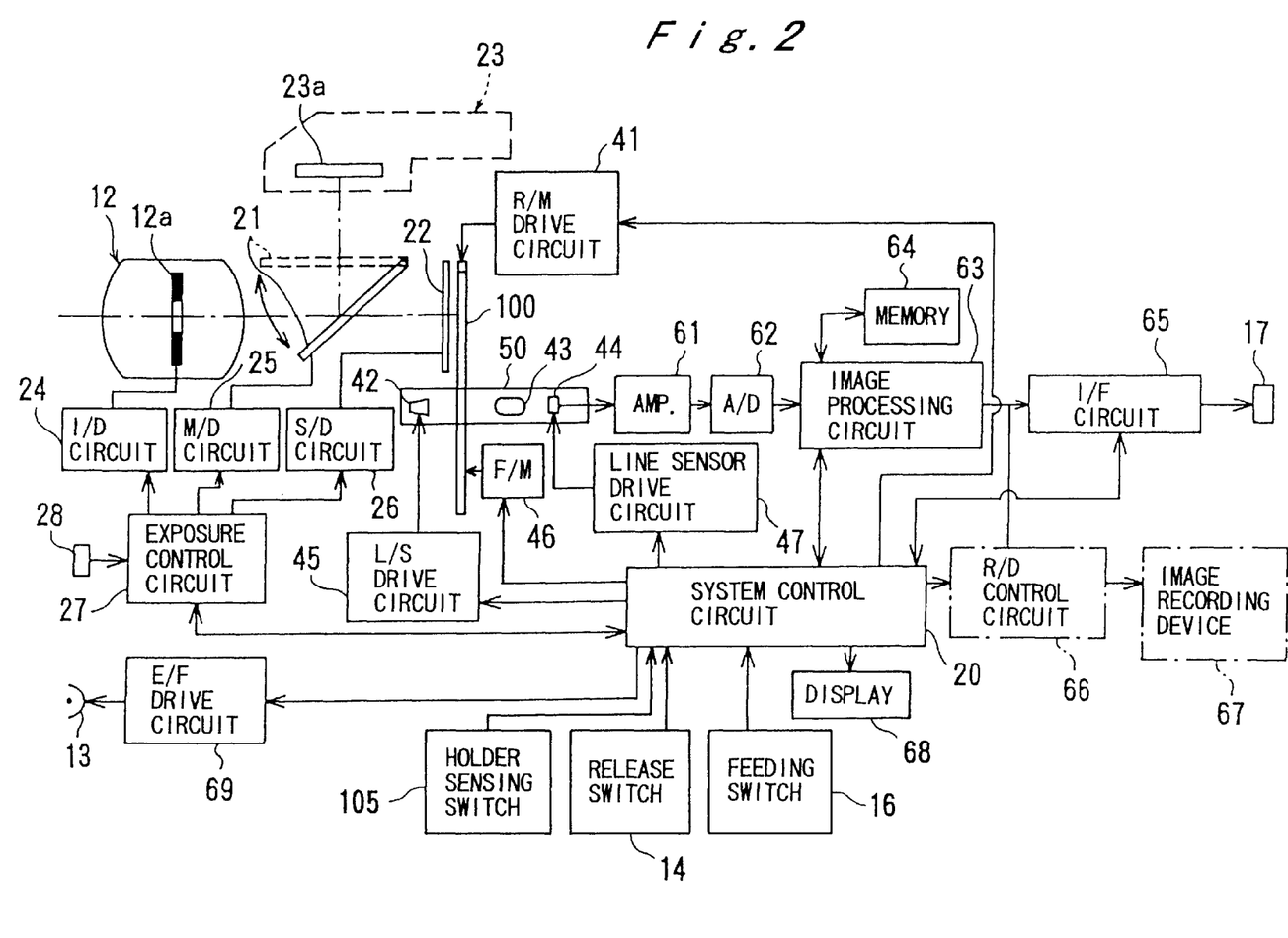
FIG. 2 is a block diagram of the still video camera of FIG. 1.

FIG. 2 is a block diagram of the still video camera.

A system control circuit 20 including a micro-computer is mounted to control the still video camera as a whole.

The photographing optical system 12 has a plurality of lens groups and an aperture 12a. The recording medium holder 100, which is mounted by a photographer through the slot 18, holding electro-developing recording mediums 30a through 30d (see FIG. 3) is disposed or mounted behind the photographing optical system 12, and a quick return mirror 21 is placed between the photographing optical system 12 and the recording medium holder 100. A shutter 22 is provided beween the quick return mirror 21 and the recording medium holder 100. A focusing glass 23a included in a view-finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under control of the exposure control circuit 27 based on an output signal of a photometry sensor 28.

The quick return mirror 21 is usually set to a down position (an inclining position shown by the solid lines in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken lines in the drawing), so that the light beam is led to one of the electro-developing recording mediums 30a through 30e.

The shutter 22 is usually closed, and upon a photographing operation, the shutter 22 is opened for a predetermined period by the shutter drive circuit 26 under control of the exposure control circuit 27, and thus, the light beam passing through the photographing optical system 12 enters a light receiving surface of one of the electro-developing recording mediums 30a through 30d, so that an object image is formed on the electro-developing recording medium by the photographing optical system 12.

An electric voltage is applied to one of the electro-developing recording mediums 30a through 30d which is positioned behind the photographing optical system 12, under control of a recording medium drive circuit 41. By exposing the electro-developing recording medium while the electric voltage is applied thereto, an image formed by the photographing optical system 12 is electronically developed on the electro-developing recording medium as a visible image. Note that the recording medium drive circuit 41 is operated in accordance with a command signal outputted by the system control circuit 20.

A support member 50 is provided parallel to the optical axis of the photographing optical system 12. A light source 42, such as an LED (light emitting diode), for example, a scanner optical system 43 and a line sensor 44 are supported by the support member 50, and the scanner optical system 43 is located between the light source 42 and the line sensor 44. The recording medium holder 100 can be moved between the light source 42 and the scanner optical system 43 in a direction normal to the optical axis of the photographing optical system 12. The line sensor 44 may be a one dimensional CCD sensor of 2000 pixels, for example.

By moving the recording medium holder 100 between the light source 42 and the scanner optical system 43, an image developed in each of the electro-developing recording mediums 30a through 30d is illuminated by the light source 42, and is formed on a light receiving surface of the line sensor 44 through the scanner optical system 43. Namely, the scanner optical system 43 is provided on the path of the light which is emitted by the light source 43 and passes through the electro-developing recording mediums 30a through 30d, so that an image formed on the electro-developing recording medium is formed on an imaging plane, on which the line sensor 44 is provided.

ON-OFF control of the light source 42 is performed by a light source drive circuit 45. Control of the reading operation of the pixel signal generated in the line sensor 44 is carried out by a line sensor drive circuit 47. Control of the movement of the recording medium holder 100 is performed by a feeding mechanism 46. The light source drive circuit 45, the feeding mechanism 46 and the line sensor drive circuit 47 are controlled by the system control circuit 20.

A pixel signal read out from the line sensor 44 is amplified by an amplifier 61, and converted to a digital signal by an A/D converter 62. The digital pixel signal is subjected to a shading correction, a dropout correction, a gamma correction and so on by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame's worth of image signals.

The pixel signal outputted from the memory 64 is inputted into an interface circuit 65 through the image process circuit 63, so that the pixel signal is subjected to a predetermined process such as a format conversion, and can be outputted to an external display device (not shown) through the output terminal 17. The pixel signal outputted from the image process circuit 63 is subjected to a predetermined process such as an image compression and a format conversion in a recording device control circuit 66, so that the pixel signal can be recorded on a recording medium, such as an IC memory card, for example, in an image recording device 67. The interface circuit 65 and the recording device control circuit 66 are operated in accordance with a command signal outputted from the system control circuit 20.

The release switch 14 and the recording medium feeding switch 16 are connected to the system control circuit 20. In accordance with operations of these switches 14 and 16, a photography operation and an image signal reading operation are performed. Further, a display device 68 for indicating various setting conditions of the still video camera, and an electronic flash drive circuit 69 for performing a flash control of the electronic flash 13 are also connected to the system control circuit 20.

Figure 3:
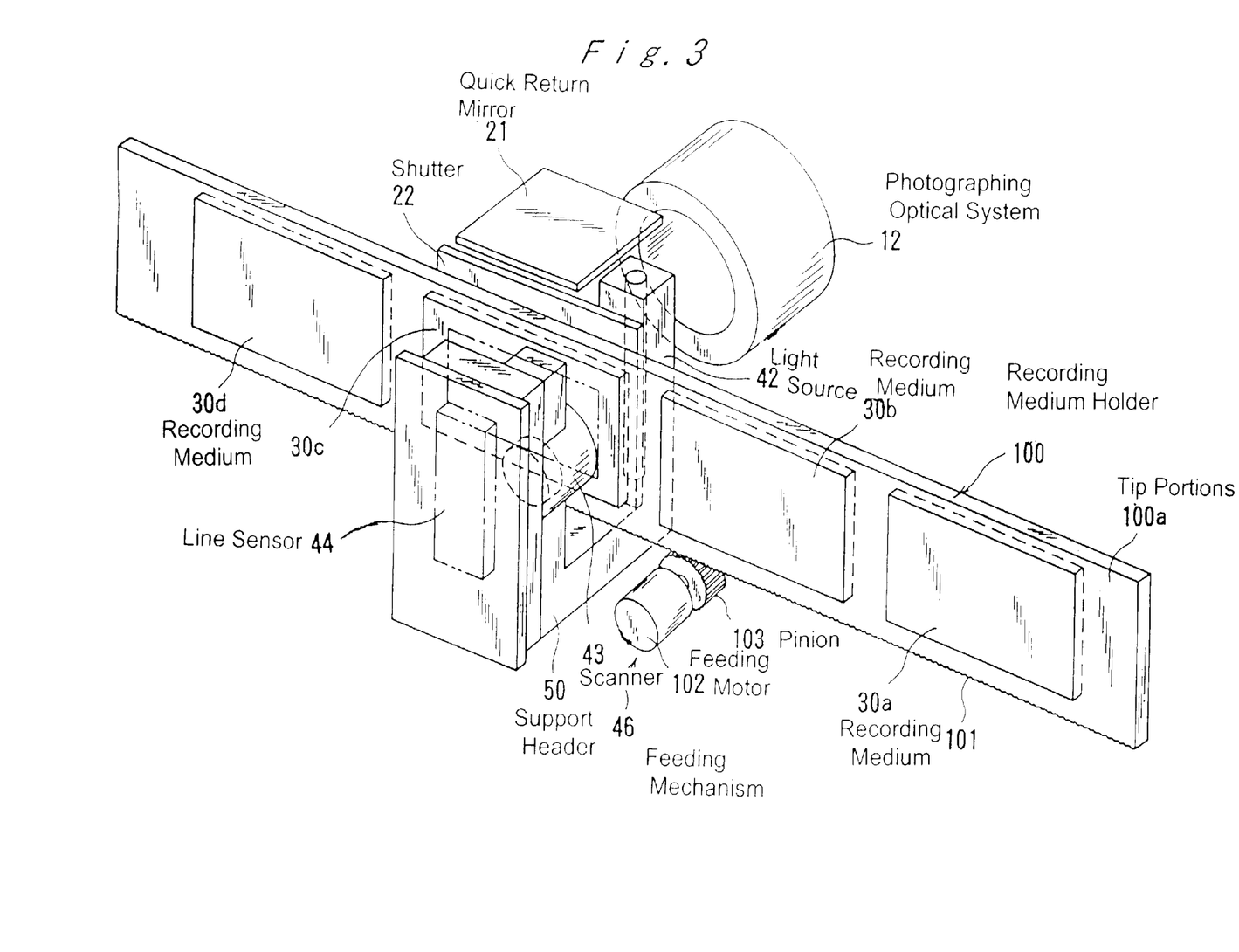
FIG. 3 is a perspective view showing a recording medium holder and elements provided close thereto.

FIG. 3 shows the recording medium holder 100 and elements provided close thereto.

The light source 42 is fixed to one end of the support member 50, and the line sensor 44 is fixed to the other end thereof. The light source 42 and the line sensor 44 are extended along the width direction (i.e., a vertical direction) of the recording medium holder 100. The scanner optical system 43 is fixed to the support member 50 and disposed close to the line sensor 44. The recording medium holder 100 is located between the light source 42 and the scanner optical system 43, and is extended in a direction normal to the optical axis of the photographing optical system 12. The recording medium holder 100 is movably connected to the feeding mechanism 46, which has a feeding motor 102 and a pinion 103 attached to an output shaft of the feeding motor 102. The recording medium holder 100 has a rack 101 which is formed on the lower surface of the recording medium holder 100 and meshes with the pinion 103. Thus, when the motor 102 is driven, the recording medium holder 100 is moved in accordance with the rotation amount of the pinion 103.

The recording medium holder 100 holds four electro-developing recording mediums 30a through 30d, which are positioned with an equal space between each medium. Both when a recording or photography operation is performed and when such an operation is not being performed, the recording medium holder 100 is positioned in such a manner that the center portion of one of the electro-developing recording mediums 30a through 30d is approximately coincident with the optical axis of the optical system of the photographing optical system 12. In this state, the light source 42, the scanner optical system 43 and the line sensor 44 are positioned corresponding to an end portion of the electro-developing recording medium.

When one photography operation is completed and the recording medium feeding switch 16 is depressed, the feeding motor 102 is driven, and thus, the recording medium holder 100 is moved and stopped so that the center portion of the next electro-developing recording medium is coincident with the optical axis of the photographing optical system 12. Namely, the electro-developing recording mediums 30a through 30d are moved in a direction different from the longitudinal direction of the line sensor 44, i.e., in a direction normal to the longitudinal direction of the line sensor 44. In this moving operation, the electro-developing recording medium, which had been located behind the photographing optical system 12 until the start of the moving operation, is moved between the light source 42 and the scanner optical system 43, so that an image developed therein is read out by the line sensor 44. For reading the image from the electro-developing recording medium, the electro-developing recording medium is moved from a first position where the line sensor 44 faces one end portion of the electro-developing recording medium to a second position where the line sensor 44 faces another end portion of the electro-developing recording medium 44.

Note that the positioning of the electro-developing recording mediums 30a through 30d with respect to the photographing optical system 12 is performed based on the number of pulse signals necessary for driving the feeding motor 102, and the count of the pulse signals is started at a position where a tip portion 100a of the recording medium 100 is engaged with the holder sensing switch 105.

Figure 4:
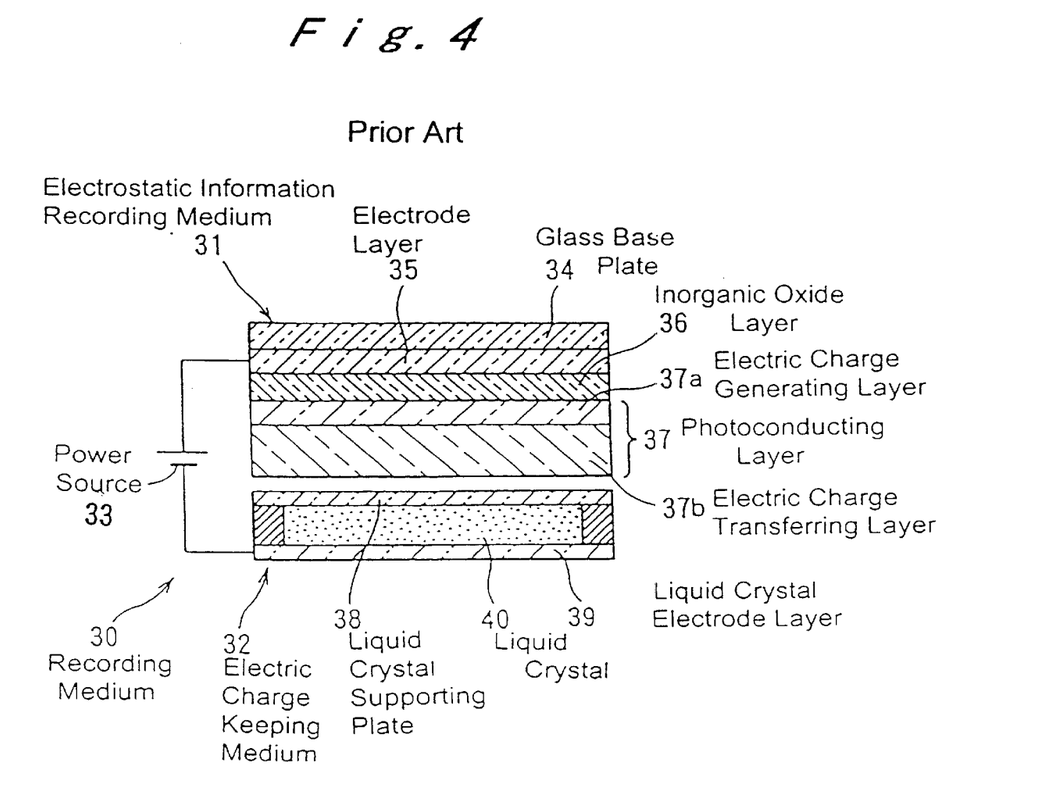
FIG. 4 is a view showing a structure of the electro-developing recording medium.

FIG. 4 shows a structure of the electro-developing recording medium 30, and is the same as that shown in Japanese Unexamined Patent Publication No. 5-2280.

Each of the electro-developing recording mediums 30a through 30d has an electrostatic information recording medium 31 and an electric charge keeping medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

The ON-OFF condition of the electric power source 33 is controlled by a recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed to light while the electric voltage is applied, an electric charge is generated in the electrostatic information recording medium 31 in accordance with an image formed thereon. Since the intensity of the electric field applied to the liquid crystal 40 changes in accordance with the electric charge, the image is indicated on the liquid crystal 40 as a visible image, and thus, an image of an object is developed. Namely, the visible image is generated in accordance with the electric charge.

The electric charge keeping medium 32 is a dispersion type liquid crystal display, and thus, the developed visible image is kept therein even if the electric field is removed. In the dispersion type liquid crystal display, the developed visible image can be deleted by heating the dispersion type liquid crystal display, using a heating device (not shown) at a predetermined temperature. In such a case, the same electric charge keeping medium 32 can be used repeatedly.

Figure 5:
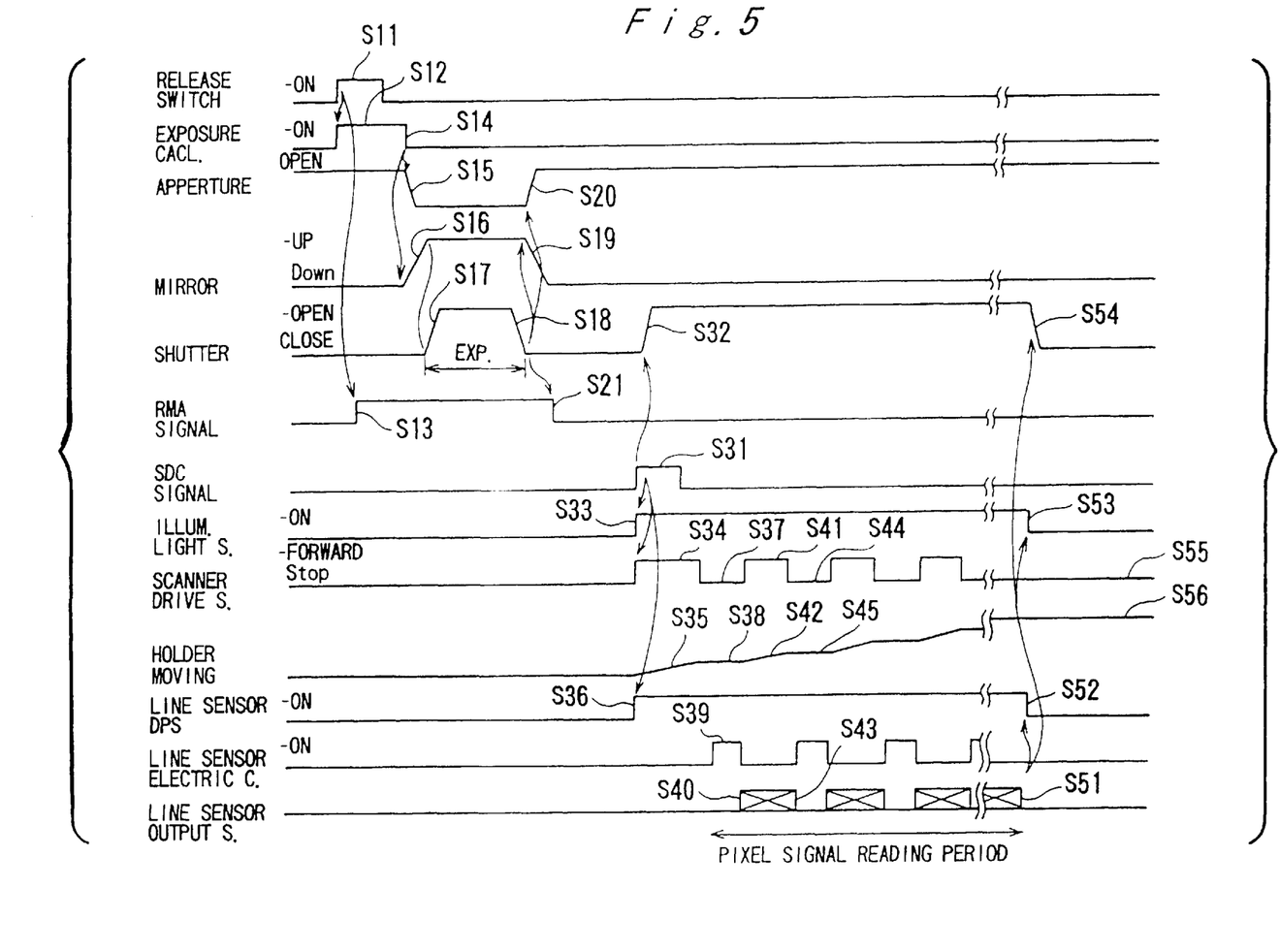
FIG. 5 is a timing chart showing a recording operation and a reading operation.

FIG. 5 is a timing chart showing a photographing operation, and a reading operation in which an image signal is read out from the line sensor 44. With reference to these drawings, an operation of this embodiment will be described below.

When it is sensed that the release switch 14 has been depressed (reference S11), an output signal of the photometry sensor 28, i.e., a photometry value, is sensed, and an exposure calculation is started based on the photometry value (reference S12). After a predetermined period has passed since the release switch 14 has been depressed, a recording medium activating signal is outputted from the recording medium drive circuit 41 (reference S13), so that the electric power source 33 is turned ON, and thus, an electric voltage is applied to the electrostatic information recording medium 31 and the electric charge keeping medium 32. When it is confirmed that the exposure calculation has been completed (reference S14), then a photographing operation is carried out in accordance with the exposure calculation result.

In the photographing operation, the opening degree of the aperture 12a is changed from the fully open state to a predetermined opening degree (reference S15), and the quick return mirror 21 is changed from the down condition to the up-condition (reference S16). When it is confirmed that the quick return mirror 21 has been changed to the up-condition and the opening degree adjustment of the aperture 12a has been completed, the shutter is opened (reference S17). When the exposure period determined by the exposure calculation has passed and it is sensed that the exposure has been completed, the shutter 22 is closed (reference S18). By the completion of the closing operation of the shutter 22, the quick return mirror 21 is changed to the down-condition (reference S19) and the aperture 12a is driven to the fully open condition (reference S20). Then, the output of the recording medium activating signal is stopped (reference S21).

Namely, the recording medium activating signal is outputted at least for the period while the shutter 22 is opened, and during this period, a predetermined voltage is applied to one of the electro-developing recording mediums 30a through 30d. Then, by exposing the electro-developing recording medium under the voltage applied condition, the object image is developed on the electro-developing recording medium as a visible object image. The visible object image is kept even if the output of the recording medium activating signal is stopped.

When it is confirmed that the quick return mirror 21 and the apperture 12a have returned to their initial positions, the operations of the quick return mirror 21 and the apperture 12a are stopped, and thus, this photographing operation ends.

Then, when the recording medium feeding switch 16 is depressed, the recording medium holder 100 is fed or moved, so that the image developed in the electro-developing recording medium is read out by the line sensor 44.

When it is confirmed that a scanner drive signal has been outputted (reference S31), the shutter 22 is opened (reference S32), and the light source 42 is energized (reference S33). Then, a scanner drive signal is outputted (reference S34), so that the feeding motor 102 is driven, and thus the recording medium holder 100 starts to move (reference S35). Then, a line sensor drive power source included in the line sensor drive circuit 47 is turned ON (reference S36).

When it is confirmed that the recording medium holder 100 has been fed by a predetermined amount and the line sensor 44 is set at a reading start position, the output of the scanner drive signal is stopped (reference S37), and thus the feeding motor 102 is stopped (reference S38). This stopping operation is controlled by counting pulse signals, for example, used for rotating the feeding motor 102.

Then, an exposure of the line sensor 44 is started, and thus electric charge accumulation in the line sensor 44 is performed (reference S39). When it is confirmed, by sensing that a constant time has passed, for example, that the exposure of the line sensor 44 has been completed, a reading scan of the line sensor 44 and an output operation of pixel signals of one horizontal scanning line from the line sensor 44 are started (reference S40). Then, the scanner drive signal for operating the feeding motor 102 is outputted (reference S41), so that the recording medium holder 100 starts to move (reference S42).

During movement of the recording medium holder 100, when it is confirmed that the reading scan has been completed, the reading scan is stopped (reference S43). Note that the completion of the reading scan is controlled by counting pulse signals, for example, which are outputted from the line sensor drive circuit 47 to drive the line sensor 44.

When the recording medium holder 100 is moved by a predetermined amount, it is deemed that the line sensor 44 has been set at the position of the next horizontal scanning line, and the output of the scanner drive signal is stopped (reference S44), and thus, the feeding motor 102 is stopped (reference S45). This stopping operation is controlled by counting pulse signals for operating the feeding motor 102, for example.

The operations described above are repeatedly carried out, and thus the reading scan for all the horizontal scanning lines, which compose the image formed in the exposed electro-developing recording medium, is performed. The number of all of the horizontal scanning lines of the exposed electro-developing recording medium may be 2000, for example. The completion of the reading operation for all the horizontal scanning lines is judged by counting the value of a counter provided for counting the stopping operation of the recording medium holder 100, for example.

Thus, in this embodiment, the recording medium holder 100 is repeatedly moved and then stopped after a predetermined time and by a predetermined amount, so that the line sensor 44 scans the image developed in the exposed electro-developing recording medium, and the pixel signals are read out from the line sensor 44.

When all of the horizontal scanning lines of the exposed electro-developing recording medium have been read out (reference S51), the drive power source of the line sensor 44 is turned OFF (reference S52), and the light source 42 is turned OFF (reference S53). Then, the shutter 22 is closed (reference S54), and the output of a scanner drive signal for operating the scan drive motor 55 is stopped (reference S55), and thus, the recording medium holder 100 is stopped (reference S56).

Thereupon, the recording medium holder 100 is advanced and positioned so that the next electro-developing recording medium is coincident with the optical axis of the photographing optical system 12. Photographing and scanning steps like those described above may then be repeated until the last electro-developing recording medium has been exposed, whereupon a suitable indication is made on display 68, and upon operation of the eject switch 19, the completely exposed electro-developing recording medium may be ejected from the slot 18.

As described above, in this embodiment, an object image is developed in the electric charge keeping medium 32 (i.e., a dispersion type liquid crystal display) of each of the electro-developing recording mediums 30a through 30d by operating the release switch 14. Then, the developed object image is sensed by operating the line sensor 44 while moving the recording medium holder 100, and is recorded in a recording medium such as an IC memory card through the image recording device 67.

The image signal sensing system, which has the electro-developing recording mediums 30a through 30d and the line sensor 44, is smaller and has a lower cost than a system having a two-dimensional sensor (i.e., an area sensor) composed of a CCD. This effect is large especially when a high quality image is recorded. Further, in this embodiment, since the image is kept in the electric charge keeping medium 32, the reading operation of the image by the line sensor 44 can be slow, a circuit for processing the image signal read from the electric charge keeping medium 32 need not be complex.

Further, according to the embodiment, since the image formed in the electro-developing recording medium is read therefrom while the recording medium holder 100 is being moved, when the next electro-developing recording medium has been positioned behind the photographing optical system 12, at the same time, a recording operation, in which another image is recorded in the next electro-developing recording medium, can be started. In other word, one of the electro-developing recording mediums is positioned so that an image is formed thereon when a reading operation, in which an image formed on another of the electro-developing recording mediums is read, has been completed. Therefore, a plurality of recording operations can be carried out in a short time.

Note that the electro-developing recording mediums 30a through 30d are not restricted to the structure described above, and may be any other structure by which an image is electronically developed.

The present invention is not restricted to a single-lens reflex camera described above, but can be applied to a lens shutter camera.

A single lens, a micro-lens array, a rod lens array and so on may be used for the scanner optical system 43.

Further, the recording medium mounted in the image recording device 67 may be a magnetic recording medium such as a hard disk or a magneto-optic recording medium such as a magneto-optic disc.

The line sensor 44 may be disposed in such a manner that a light beam reflected by the electro-developing recording mediums 30a through 30d is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-323491 (filed on Dec. 1, 1994) which is expressly incorporated herein, by reference, in its entirety.

I claim:

1. An image signal sensing device comprising:

a plurality of an electro-developing recording medium electronically develop image formed thereon;

a photographing optical system through which a beam of light passes, said beam of light impinging upon an electro-developing recording medium, of said plurality of electro-developing recording media, to form an image, that is electronically developed, on said electro-developing recording medium;

an image forming device that forms an image on an imaging plane associated with an image formed on said electro-developing recording medium of said plurality of electro-developing recording media;

a line sensor provided, at a first position, on said imaging plane, corresponding to one end portion of said electro-developing recording medium facing said photographing optical system;

a feeding mechanism that moves said electro-developing recording medium relative to said line sensor, such that said electro-developing recording medium is moved from said first position to a second position where said line sensor faces another end portion of said electro-developing recording medium, so that as said line sensor reads said image formed on said imaging plane, another electro-developing recording medium of said plurality of electro-developing recording media is positioned to have another image formed on said another electro-developing recording medium by said photographing optical system; and a controller that controls said feeding mechanism, said beam of light, and said line sensor to read said image formed on said electro-developing recording medium, wherein, after said image is developed, said controller controls said feeding mechanism to move said electro-developing recording medium so that said image is read by said line sensor while said another electro-developing recording medium is positioned to have said beam of light impinge on said another electro-developing recording medium.

2. An image signal sensing device according to claim 1, wherein said feeding mechanism moves said plurality of and electro-developing recording media in a direction different from a longitudinal direction of said line sensor.

3. An image signal sensing device according to claim 2, wherein said feeding mechanism moves said plurality of and electro-developing recording media in a direction normal to longitudinal direction of said line sensor.

4. An image signal sensing device according to claim 1, further comprising a recording medium holder that holds said electro-developing recording medium, said recording medium holder being movably connected to said feeding mechanism.

5. An image signal sensing device according to claim 4, wherein said feeding mechanism has a pinion and a motor rotating said pinion, and said recording medium holder has a rack meshing with said pinion.

6. An image signal sensing device according to claim 1, wherein said recording medium holder is positioned in such a manner that a center portion of said electro-developing recording medium is approximately coincident with an optical axis of said photographing optical system.

7. An image signal sensing device according to claim 1, wherein said manner that said line sensor reads said image formed on said imaging plane.

8. The image signal sensing device of claim 1, further comprising a shutter positioned between said electro-developing recording medium and said photographing optical system, said shutter being selectively operated to permit light to impinge said electro-developing recording medium.

9. An image signal sensing device, comprising:

a plurality of electro-developing recording media upon which images are electronically developed;

a first optical system through which a beam of light passes, said beam of light impinging upon an electro-developing recording medium, of said plurality of electro-developing recording media, to form an image, that is electronically developed, upon said electro-developing recording medium;

a light source that illuminates said electro-developing recording medium of said plurality of electro-developing recording media;

a second optical system disposed on an optical path of a light beam generated by illuminating said electro-developing recording medium with said light source;

a line sensor disposed on an imaging plane at a first position corresponding to one end portion of said electro-developing recording medium, an image being formed by said second optical system;

a feeding mechanism that moves said electro-developing recording medium past said line sensor from said first position to a second position where said line sensor faces another end portion of said electro-developing recording medium, another electro-developing recording medium of said plurality of electro-developing recording media being positioned to have another image formed on said another electro-developing recording medium by said first optical system while said image formed on said imaging plane is read by said line sensor; and a controller that controls said feeding mechanism, said beam of light, and said line sensor to read said image formed on said electro-developing recording medium, wherein, after said image is developed, said controller controls said feeding mechanism to move said electro-developing recording medium such that said image is read by said line sensor while said another electro-developing recording medium is positioned to said another image formed on said another electro-developing recording medium.

* * * * *